Oct. 2, 1934.   H. H. WOODWARD ET AL   1,975,674
PRESS
Filed June 23, 1931   5 Sheets—Sheet 2

INVENTORS
*Herman H. Woodward*
*Alpha H. Wright*
BY THEIR ATTORNEY

Oct. 2, 1934.  H. H. WOODWARD ET AL  1,975,674
PRESS
Filed June 23, 1931  5 Sheets-Sheet 3

Inventors
Hermon H. Woodward
Alpha H. Wright
By their Attorney

Oct. 2, 1934.  H. H. WOODWARD ET AL  1,975,674
PRESS
Filed June 23, 1931  5 Sheets-Sheet 4

Inventors
Herman H. Woodward
Alpha H. Wright
By their Attorney

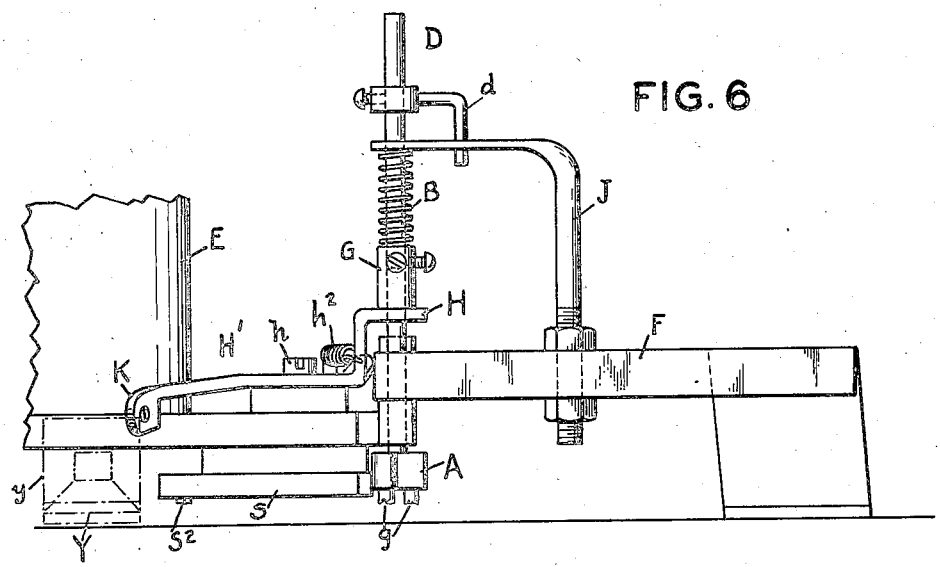
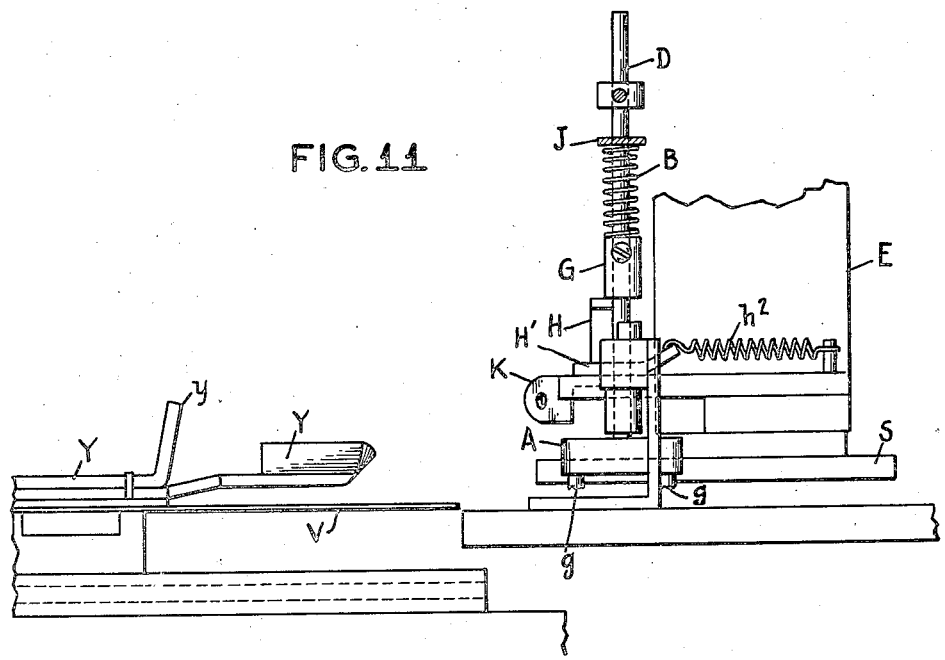

Patented Oct. 2, 1934

1,975,674

UNITED STATES PATENT OFFICE 1,975,674

PRESS

Hermon H. Woodward, Troy, and Alpha H. Wright, Albany, N. Y., assignors to Hall, Hartwell & Co., Inc., Troy, N. Y., a corporation of New York Application June 23, 1931, Serial No. 546,374

9 Claims. (Cl. 223—55)

Our invention relates to presses, particularly adapted for the pressing and/or shaping of small articles along accurate lines, as in gloves, stockings, collars, etc.

In the accompanying drawings we have shown a form of our invention adapted for pressing collars, wherein, Fig. 1 is a plan of the die portion of the machine with the shaper removed;

Fig. 6 is a side elevation of the holder;

Fig. 11 shows the holder lifted.

It is the purpose of our press to provide an external framework or form to which the article to be pressed is closely fitted, and after it is thus fitted, the press descends and compresses the article within the confines of the enclosing framework, the article also being maintained in its position within the framework by spring-pressed holders dropped on it at the right instant.

For the purpose of inserting the article into the space or recess we may employ internal blades which carry the article into its position with speed and positiveness, but such blades must be retracted, for the pressing action, leaving only the article in place within the recess. Thereby the pressing is exerted only on the fabric itself, which at the time of pressing, is not being stretched or distorted by the presence of the internal placing-blades. At that time the fabric is only confined by the external framework and the pressure exerted on it merely condenses it within its confining borders.

Figure 1:
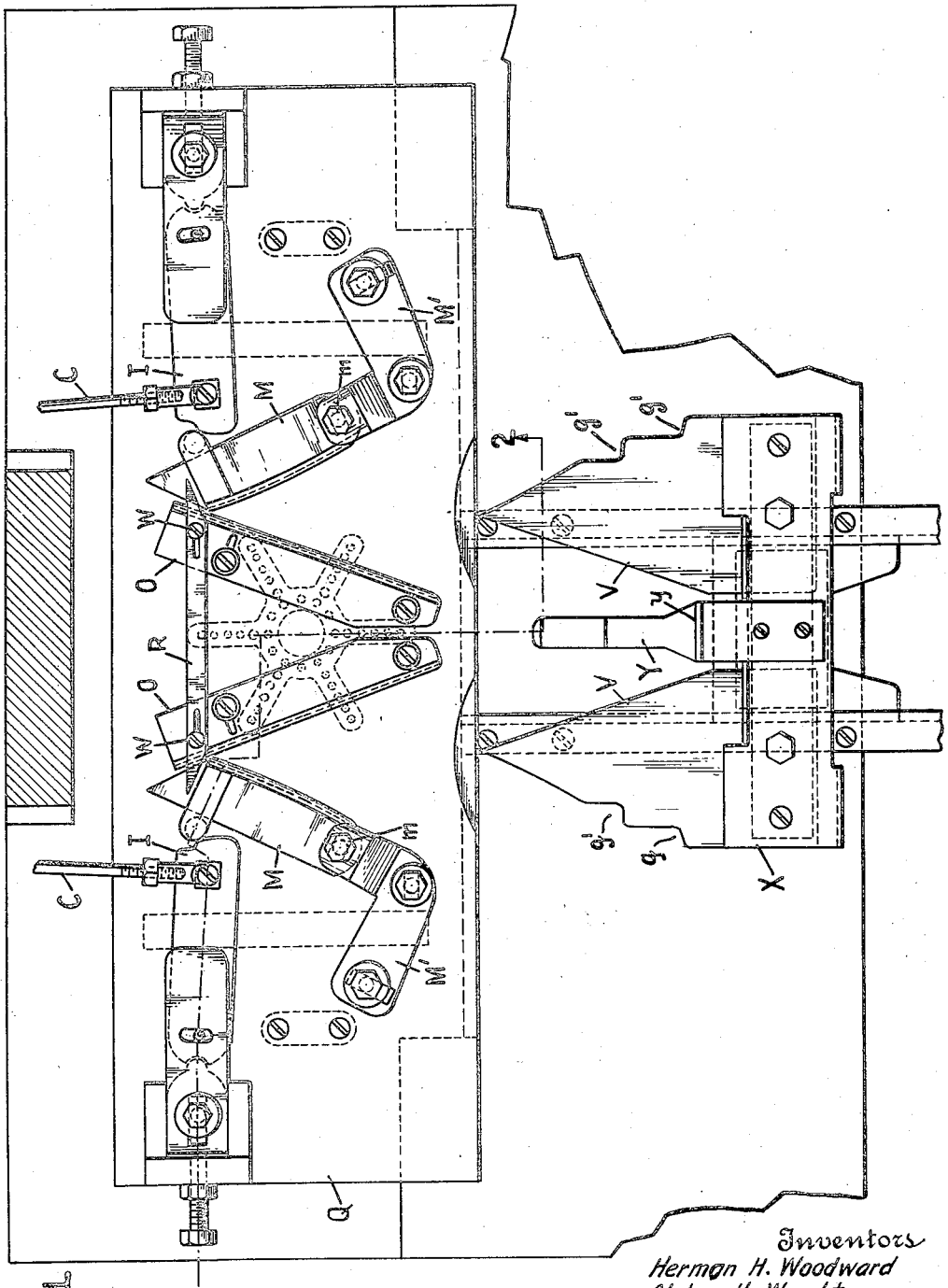
Figure 2:
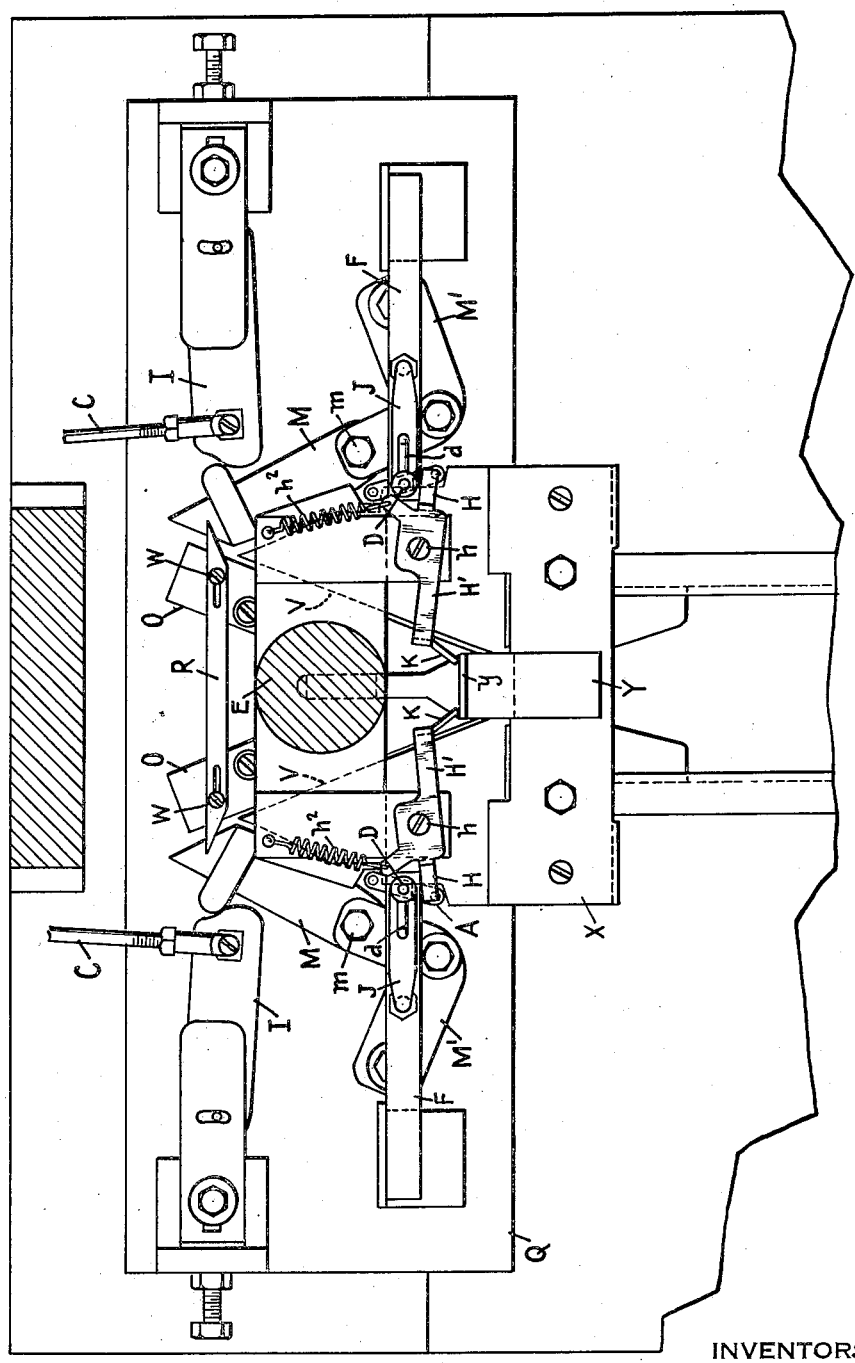
Fig. 2 is the same as Fig. 1 with the shapers inserted; and holder in place.
Figure 7:
Figs. 7, 8, 9 and 10 illustrate the fabric in relation to the shaper.
Figures 8, 9, 10:
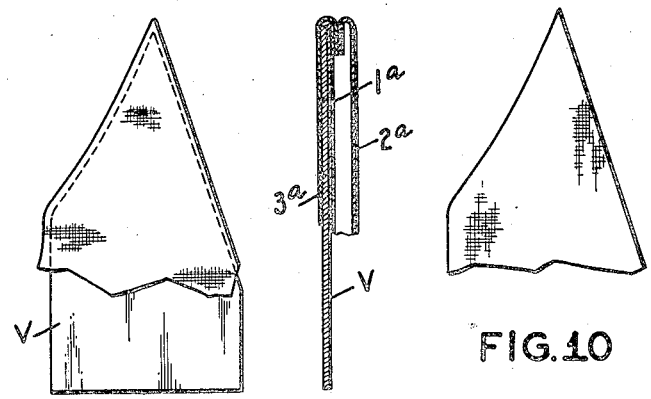

Referring to Fig. 1, the underlying base of the press is shown at Q. This base Q is heated in suitable manner, as by an ordinary gas burner or electrical unit. On this base are two pairs of bars M and O, respectively which outline the article to be pressed and constitute what we have referred to as a framework defining the space within which the compression occurs. In this case, the article is a collar and the triangular spaces between bars M and O conform to the two points of two collars. A point on each of two collars is laid in each of the two triangular spaces between bars M on the outside and bars O on the inside of the compression space. The inside bars O, O, are rigidly secured to the base Q by screws and a spacing bar R held by screws W, W, but the bars M, M, are each pivoted at one end, viz., at the points marked $m, m$, so as to yield, in contrast to the unyielding fixity of bars O, O. The pivoted points of M, M, may be adjustable at $m, m$, and the studs $M^1, M^1$, to which they are pivoted may also be adjustable. Thereby the position of bar M can be set with exactness, and its outer end is also beveled so as to fit against its stationary companion bar O when pressed home against it by the cam I operated by rod C and bearing against a roller on M. Thereby the V-shaped recess formed by bars M and O can be very exactly defined and the material pressed within that recess will have, when pressed, a fixed standard outline conforming to the space between the two bars. While a sharply pointed collar is indicated in this example of our invention, a collar with a rounded point may, in like manner, be defined by the bars M and O, or it may be the finger of a glove, or the heel of a stocking which is to be pressed and in such case the bars M and O will be correspondingly shaped to provide between them an accurately defined recess in which the article is to be pressed. In the case of a collar it is convenient to convey the article into the pressing space or recess, by means of a blade or carrier. Two such blades V, V, are shown in Fig. 1. The collar points are placed on one of these blades which then advances into the recess. In Figs. 7-10 the fabric is shown in position on a blade V, ready to be pushed forward into the recess. In Fig. 9 three plies of fabric are shown, to-wit, a lining-piece $1^a$, a facing $3^a$, and a back piece $2^a$. These three pieces are laid face to face and sewed along one edge. Then the three are turned inside out, as indicated in Fig. 9, and the blade V is inserted between plies $1^a$ and $3^a$. At the point of the collar any excess of overlying plies may be cut off, as shown in Fig. 7. Then the blades are moved forward carrying the collar point into the pressing recess, as shown in Fig. 2. In this Fig. 2 the points are nearly in the recesses and the bars M, M, are ready to be pressed home. The carrier X for the blades V, V, also carries between the blades V, V, a tongue Y which comes under the pressing platen, when the blades are advanced into the recesses, and positively prevents the press from descending on the fabric in the recess until the blades V, V, together with tongue Y, have been retracted, leaving the fabric behind them in the recesses. This compels the pressing to occur only after the carrier blades V, V, are withdrawn out of the fabric. In order to prevent the withdrawal of the fabric by frictional adhesion to the carrier blades, we provide certain spring-pressed stops or holders, shown in Figs. 6 and 11, marked A. There are two of these holders, one on either side of the blades V, V, but only one need be described, since the other is a duplicate. Each holder A is carried on the lower end of a vertical rod D and has on its under side two notched prongs, g, g, to grip the fabric. The rod D slides freely up and down through the outer end of a guide J, being prevented from turning therein by a wire d secured to D and traveling therewith through a hole in guide J. A sleeve G is secured to rod D and a spring B, abutting against guide J presses downward against sleeve G. In Fig. 11 a stop H carried by the press is shown under the lower edge of sleeve G and holding rod D and its holder A in an elevated position. Obviously if this stop H should be moved out from under sleeve G, the rod and its holder would drop, under the pressure of spring B and the prongs g, g, would bite into the underlying fabric. As shown in Fig. 6, this stop H is formed as an offset from one end of a lever $H^1$, pivoted to the base of the press E at h, and the stop H is held in its normal position under the edge of sleeve G by a spring $h^2$. To remove the stop from this normal position and allow rod D and holder A to drop, it is only necessary to turn the lever H a slight distance. This occurs, as appears most clearly in Fig. 2, when the advancement of the blades V, V, and tongue Y, brings the upturned plate y of the tongue against the down-turned end K of the lever $H^1$. This occurs at the end of the advance stroke of blades V, V, and tongue Y and the holder A thereupon descends upon the underlying fabric and there remains until the descent of the press, brings stop H, carried thereby, down to the dropped level of sleeve G. Thereupon stop H resumes its normal position under the edge of sleeve G and when the press again rises, it lifts up the sleeve G, together with the holder A and rod D to their normal elevated position. The prongs g, g, on holder A, pass through the notches $g^1$, $g^1$, in the side edges of blades V, V, which notches are clearly shown in Fig. 1.

Figure 3:
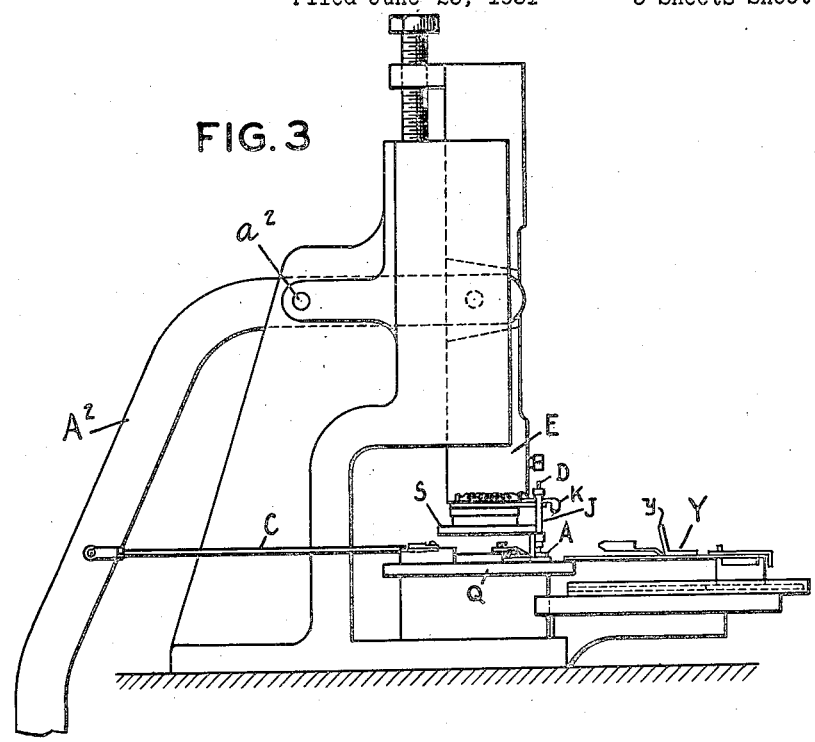
Fig. 3 is a side elevation.
Figure 5:
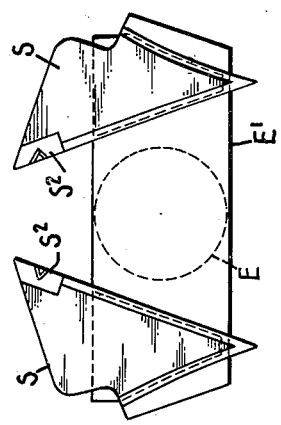
Fig. 5 is a face view of the presser dies.
Figure 4:
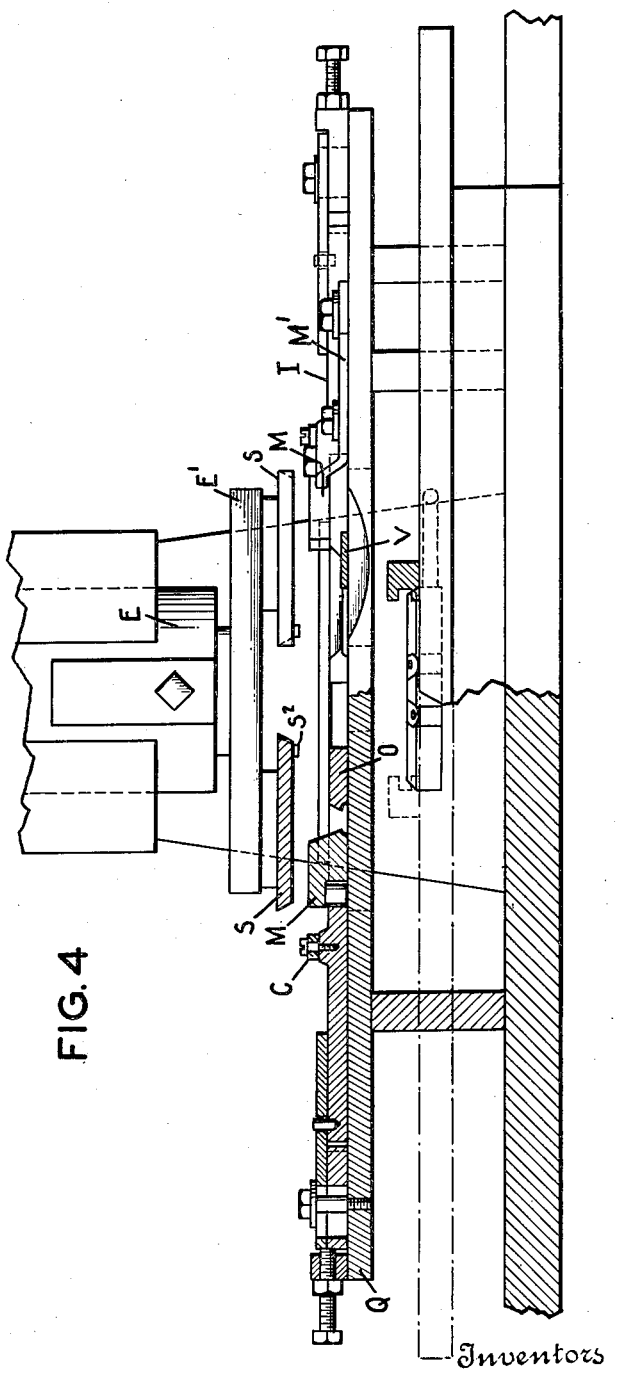
Fig. 4 is a front elevation of Fig. 2 partly in section.

The press is brought down, in this particular machine, by foot power. Referring to Fig. 3, the foot lever $A^2$ is pivoted at $a^2$ and acts, at its short horizontal arm, on the plunger E to depress it. On the lower end of plunger E is a plate $E^1$, see Figs. 4 and 5, on the under side of which are two triangular shaped platens S, S, which fit into the triangular recesses defined by the bars O and M described above. The press cannot descend, while the blades V, V, are in their forward location and acting to position the collar points in the compressing recesses. That is due to the tongue Y which moves forward with blades V, V, to a position under the press. Only after those blades and tongue Y are withdrawn can the press be brought down and the platens S, S, enter the triangular recesses containing the now positioned collar points. Thus the platens S, S, as they enter those recesses, encounter only the frabric of the collar points, which at this time are free from any stretching effects of the positioning blades V, V. Therefore, the seam at the edges of the collar points will be rolled under the edge of the top layer of fabric, which is no longer stretched out by the internal blades, V, V. The press will compress only the fabric, instead of the fabric distended by the internal blades V, V. As shown in Fig. 3, the foot-lever $A^2$, as it is pushed toward the left, also draws on the rods C leading to the pivoted cams I which act to press the bars M, M of the above defining framework mentioned above, to their final position relative to their companion stationary bars O, O. When the pressing is ended, the foot lever returns to its normal position, thereby lifting the holders off the fabric and allowing all the parts to relax and the collar points to be removed. It should also be observed that each of the pressing plates, S, S, has set into its edge a knife or awl, shown at $S^2$, $S^2$, in Fig. 5, which acts to cut or score the fabric as the platens compress it at an accurately defined point. For example, it may mark the point at which the collar-band is to be subsequently attached to the top of the collar in order to insure collar points of equal length, or in the other articles, it may definitely indicate the uniform position of buttons, button holes, or other features. This machine enables us to compress a fabric, seamed at its edges along an accurately defined line, the article treated, here shown as a collar point, being any article having a shape and character suitable for the services of the machine.

What we claim as new and desire to secure by Letters Patent is:

1. A press comprising an external form composed of bars adjustably mounted on a base to outline the article to be pressed and provide a pressing recess therefor, a conveying blade for positioning an article in the recess and so constructed and arranged that it may be withdrawn from the positioned article, a holder for the article released automatically by the machine, and a platen corresponding in form to the said recess and adapted to enter the recess under pressure.

2. A press comprising an external form composed of bars adjustably mounted on a base, a reciprocating carrier for positioning an article in the recess formed by said bars, a holder for the article released by the advance of said carrier, and a press by which said holder is lifted and containing a platen corresponding in form to said recess and adapted to enter the recess under pressure.

3. A press comprising an external form composed of bars adjustably mounted on a base to provide a recess, one side of that recess being fixed and the other side movable, a reciprocating carrier for positioning an article in said recess, a press with a platen conforming to the shape of said recess, and a stop controlled by said carrier for preventing the advance of said platen to the recess until said carrier has been withdrawn.

4. A press comprising an external form composed of bars adjustably mounted on a base to provide a pressing recess, a reciprocating carrier for positioning an article in said recess, a press with a platen adapted to enter said recess under pressure, a holder for the article to be pressed, a latch on the press for maintaining said holder away from said article and an extension on said carrier adapted to engage said latch on its advance movement, whereby the releasing of said holder is determined by the advance of the carrier.

5. A press comprising one or more external forms composed of bars adjustably mounted on a base to outline the article or articles to be pressed and providing one or more pressing recesses therefor, one or more conveying blades for positioning the article or articles in the recess or recesses and being then withdrawn, one or more holders for the article or articles released automatically by the machine and one or more plates corresponding in form to the said recess or recesses and adapted to enter the recess or recesses under pressure and heat.

6. A press comprising an external form composed of bars adjustably mounted on a base to provide a pressing recess, a reciprocating carrier for positioning an article in said recess, pressure means acting on the article, said pressure means including means for adjusting said bars, and a marker to cut or score the article at an accurately defined point.

7. A press comprising a base, an external form composed of two relatively adjustable bars mounted on said base in such manner as to provide an article-receiving recess, an article carrying conveyor blade movable into and out of said recess, a platen complemental to said recess, means for reciprocating said platen, and means operated by movement of the platen for imparting adjusting movements to one of said bars.

8. A press comprising a base, an external form composed of two relatively adjustable bars mounted on said base in such manner as to provide an article-receiving recess, an article carrying conveyor blade movable into and out of said recess, a platen complemental to said recess, an operating cam engaging one of said bars, means for reciprocating said platen, and means operated by movement of the platen for actuating said cam.

9. A press comprising one or more external forms each composed of bars adjustably mounted on a base in such manner as to provide article-receiving recesses, an article carrying conveyor blade or blades movable into and out of said recesses, one or more pressure plates corresponding to the form of the recess or recesses and so constructed and arranged as to enter the recess or recesses under pressure and heat, means for reciprocating said pressing plate or plates, and means for preventing application of pressure by said plate or plates until said article carrying blade or blades have been withdrawn.

HERMON H. WOODWARD.
ALPHA H. WRIGHT.